United States Patent [19]
Osborne

[11] Patent Number: 5,273,687
[45] Date of Patent: Dec. 28, 1993

[54] MICROBIOLOGICAL CONTROL OF RECIRCULATING WATER IN EVAPORATIVE COOLING SYSTEMS AT IDLE CONDITIONS

[75] Inventor: William T. Osborne, Severn, Md.

[73] Assignee: Baltimore Aircoil Company, Jessup, Md.

[21] Appl. No.: 988,053

[22] Filed: Dec. 9, 1992

[51] Int. Cl.$^5$ .................................... B01F 3/04
[52] U.S. Cl. ........................... 261/29; 261/98; 261/111; 261/DIG. 46
[58] Field of Search ............ 261/29, 110, 111, 97, 261/98, DIG. 46

[56] References Cited

U.S. PATENT DOCUMENTS

| | | | |
|---|---|---|---|
| 2,142,289 | 1/1939 | Sloan | 261/DIG. 46 |
| 2,910,279 | 10/1959 | Wood | 261/DIG. 46 |
| 3,094,133 | 6/1963 | Treanor | 261/29 |
| 3,196,892 | 7/1965 | Savage et al. | 261/DIG. 46 |
| 3,684,477 | 8/1972 | Blumbergs et al. | 71/67 |
| 3,754,741 | 8/1973 | Whitehurst | 261/97 |
| 3,788,340 | 1/1974 | O'Leary et al. | 261/DIG. 46 |
| 3,956,502 | 5/1976 | Slovinsky et al. | 424/304 |
| 3,996,155 | 12/1976 | Slovinsky et al. | 252/312 |
| 4,010,277 | 3/1977 | Swered et al. | 424/298 |
| 4,100,052 | 7/1978 | Stillman | 204/268 |
| 4,125,719 | 11/1978 | Grier et al. | 544/215 |
| 4,172,786 | 10/1979 | Humphrey et al. | 210/57 |
| 4,464,315 | 8/1984 | O'Leary | 261/110 |
| 4,681,948 | 7/1987 | Worley | 548/319 |
| 4,816,061 | 3/1989 | Walter, Jr. et al. | 71/67 |
| 4,839,064 | 6/1989 | McBurney et al. | 210/806 |
| 5,015,660 | 5/1991 | Hidaka et al. | 514/441 |
| 5,025,002 | 6/1991 | Effenberger et al. | 514/112 |
| 5,057,612 | 10/1991 | Worley et al. | 548/301 |

*Primary Examiner*—Tim Miles
*Attorney, Agent, or Firm*—Edward J. Brosius; F. S. Gregorczyk; Thomas J. Schab

[57] ABSTRACT

The present invention provides apparatus and the method to treat process water of heat exchange systems with fluid flow through the system at an idling or inoperative system mode, which system may have a biocidal treatment arrangement coupled thereto.

23 Claims, 6 Drawing Sheets

MICROBIOLOGICAL CONTROL OF RECIRCULATING WATER IN EVAPORATIVE COOLING SYSTEMS AT IDLE CONDITIONS

FIELD OF THE INVENTION

The present invention relates generally to the field of process water treatment. More specifically the present invention provides an improved method and apparatus for adding water treatment chemicals to a recirculating water system of evaporative heat exchange equipment at an idle or inactive condition.

BACKGROUND OF THE INVENTION

Evaporative heat exchange and air cooling equipment is well known in the art and includes cooling towers, evaporative condensers, closed-circuit evaporative fluid coolers, direct evaporative coolers, air washers and gas scrubbers, among others. Evaporative heat exchange equipment is typically utilized to provide cooling to a process by rejecting heat from the process or system to the atmosphere. In operation, evaporative heat exchange equipment is utilized to contact heat and water from a process with air. During this contact, heat and mass transfer occur simultaneously, resulting in a portion of the water being evaporated into the air. The energy required to evaporate the water is supplied from the sensible heat of the water, which is not evaporative. Accordingly, the temperature of the non-evaporative water is reduced and cooling has been accomplished. The cooled water is then circulated back to the process wherein it picks up added heat. The heated water is then recirculated back to the evaporative heat exchange equipment for cooling.

The water recirculated through evaporative cooling equipment can become contaminated with impurities during this recirculating operation. These contaminants are introduced to the recirculated water in several ways including for example, air-borne impurities washed out of the air into the recirculated water. These impurities are typically suspended in the recirculated water and can build up over time to possibly clog or block passageways within the fluid system, or further may cause corrosion problems. In addition, dissolved solids in the evaporated water are left behind in the recirculating water during the evaporation process. The situation with regard to the dissolved solids is further exacerbated by the addition of dissolved solids introduced to the system via the make-up water added to replenish evaporated water. As a result of this evaporation and replenishment, the dissolved solids level in the recirculated water can increase to unacceptable levels and cause scaling of heat transfer surfaces and corrosion of system components.

Biological organisms are also being added to the evaporative heat exchange system through the make-up water and from the air passing through the cooling tower. The warm, moist, oxygen rich environment of evaporative cooling equipment represents a planned habitat for biological growth. Microbiological growth typically comprises algaes, slimes, and bacteria. These growths can cause fouling of heat transfer surfaces resulting in reduced operating efficiency, and in severe cases, can completely block passageways within the system.

In order to overcome these entrained contaminants in the recirculated water during operation of evaporative heat exchange equipment, it is typically necessary to treat the recirculated water to maintain its quality within acceptable operating levels. Generally this treatment entails several alternative processes. As an example, the level of dissolved solids present in the recirculated water may be controlled through a process of bleeding off a portion of the water with the highly dissolved solids and thereafter replacing it with fresh make-up water. In those cases where simple bleed and fresh water replenishment is insufficient to control the scaling or corrosive tendency of the recirculating water, specialized scale and corrosive inhibiting water treatment chemicals are utilized. It is generally difficult to effectively and efficiently control microbiological growth within evaporative cooling systems. This difficulty arises in part from the variable conditions present in such systems. This is especially true when evaporative heat exchange equipment is used in comfort cooling, or conditioning systems, which equipment operates a constantly changing condition.

In an air conditioning system for example, the air conditioning is typically required during the warmest period of the day. During this time, the load or the amount of heat to be rejected from the evaporative cooling equipment, is generally at its greatest. As the load increases, the temperature of the recirculated water is also increasing and the volume of air passed through the tower may similarly increase. During such periods, the rate of microbiological growth within the system and the rate of addition of microbiological organisms to the system are at the highest levels. As the outdoor temperatures begin to fall during evening hours and the need for air conditioning decreases, the load on the evaporative cooling equipment and the temperature of the recirculating water also decrease. During such periods, the rate of biological growth and the rate of addition of microbiological organisms are lowered.

In general, biological growth within evaporative heat exchange systems is controlled through the addition of biocide chemicals to the recirculating water. Several different methods typically have been utilized to add biocide to the recirculating water of evaporative heat exchange equipment. The common approach is to pump liquid biocide chemicals from a drum or other container directly into the recirculating water system. This is generally done on a timed basis with a pre-set amount of liquid biocide being added periodically such as on an hourly or daily basis. In some cases, the amount of biocide chemical pumped into the system is done in response to a measured biocide concentration within the recirculating water system. Unfortunately, such automatic biocide feed systems are expensive and require significant human attention to ensure that the proper amount of biocide chemical is supplied to the recirculated water system. In addition, the operator must periodically replace the chemical drum or container when it is empty. Further, in those cases where biocide chemicals are added on a timed basis the biocide chemical is typically overfed during times when the rate of biological growth is slow and underfed when the biological growth rate is high.

An alternative method utilized to introduce biocide chemicals to recirculating water of heat exchange equipment is to pass a side stream flow of recirculating water through a bed of solid biocide chemicals. As the side stream flows through the bed of chemicals, a portion of the biocide chemicals are dissolved into the water stream. However, to prevent the particulate matter contained within the recirculating water from clogging or contaminating the chemical bed, it is typically necessary to filter the side stream water passing through this chemical bed to remove particulate matter prior to its entry into the chemical bed.

A final method utilized to add biocide and other treatment chemicals to recirculating water systems is to manually "hand-dose" or "slug" chemicals to the evaporative heat exchange equipment. Typically, this method is chosen on smaller systems, where the cost of expensive automatic feed systems cannot be justified.

When utilizing this hand-dose method, the operator must manually add large quantities of treatment chemicals to the recirculating water system on a periodic basis, such as once or twice weekly. This method results in erratic corrosion, scaling and microbiological control and can potentially cause serious health hazards when pathogenic organisms are present in the system. As an example, if the time between slug doses of biocide is great enough, and if the pathogen present in the system has a rapid growth rate, the population of such pathogen can increase to potentially dangerous levels between doses of biocide.

Another problem that must be continuously addressed by any microbial control method is the potential of build-up of bio-films and deposits on system components. Biocides are formulated and designed to attack microbiological organisms, which are free in the bulk water. Such biocides are less effective when utilized to control microorganisms contained within bio-films and deposits. This ineffectiveness could be due to the biocides inability to penetrate the deposit or bio-film or due to the fact that the biocides are consumed by reactions in the water phase or at the surface of the film or deposit.

It is important when controlling the above-noted problems in evaporative heat exchange equipment, that treatment chemicals are added in proportion to the need for chemical control within the system and that some level of treatment be maintained within the system at all times. Treatment chemicals should be added in proportion to their need within the system in order that the concentration of treatment chemical within a system be held relatively constant. This would result in the effective control of the microbial populations while utilizing the minimum amount of biocide chemical. In addition, a continual presence of biocide, even at low concentrations, is needed to effectively control microbiological deposits and bio-films.

SUMMARY OF THE INVENTION

It is an object of the present invention to provide an improved method and apparatus for treatment of process water in an evaporative heat exchange system particularly during a period of idle or inactive operation of such heat exchange system or its coupled environment. When coupled to evaporative heat exchange systems having automatic biocide systems, this invention provides an effective means for continuously controlling the growth of microbiological organisms, and microbiologically-induced corrosion and scaling, and optimizes treatment chemical usage with the addition of an uncomplicated easily installed component structure. In addition, this invention requires minimal capital investment, it may be operated for extended periods of time without human attention and is retrofitable to extant structures.

In U.S. patent application No. 07/900244, a canister is interposed between the make-up water supply system and the sump of a cooling tower to provide biocide to the sump and thus to the recirculating water system at a controlled rate of introduction. The particular structure taught and illustrated in the above-cited patent application provides an exemplary structure for utilization with the present invention, however, it is not a limitation to the operation of the present invention.

In evaporative heat exchange systems, the rate of make-up water flow into the system is substantially proportional to the need for microbial control within the recirculated water for this above-cited patent application. At times when the make-up flow into the evaporative heat and exchange system is high, the need for controlling the system is also generally high, and vice versa. Therefore, by adding treatment chemical through the evaporative cooling equipment via the make-up line, the chemical addition to the recirculated water is synchronized with the amount of treatment chemical required in the system for microbial scale or other control. However, the present invention provides a controlled and nominal flow through the primary components of the heat exchange system by a controlled rate of flow from the make-up supply system through the sump and recirculating apparatus to a discharge port or point to continuously draw both make-up water, and thus biocide, to and through the recirculating system to continuously provide for microbial control during periods of down time or inoperation of the feed exchange system. This down time operation obviates the need for manual monitoring of the system during periods of prolonged disuse, such as weekend shutdowns or shutdowns for maintenance. The choice of a biocide chemical is indirectly important in the present invention, but as noted above in the prior application environmental iodine is preferred because of its efficacy in controlling microbiological organisms when used at relatively low, environmentally acceptable concentrations. In addition, elemental iodine has a low solubility in water. However, it is understood that iodine, chlorine and bromine containing compounds may also be utilized as biocide chemicals. The particular biocide will be introduced into the make-up water flow and the concentration of iodine in the resultant make-up flow will be substantially constant.

The present invention may be operable either manually or automatically. The operation of the invention easily lends itself to automatic operation, but it is within the purview of the present invention to provide for manual operation at the discretion of the user. The process for adding make-up water to the evaporative cooling equipment is generally automatically controlled through the sump system as this demand for make-up water is continuously changing. Therefore, addition of the biocide into the make-up water supply, is readily adaptable to an automatic control system in extant heat exchange apparatus.

BRIEF DESCRIPTION OF THE DRAWINGS

In the figures of the drawings, like reference numerals identify like components, and in the drawings:

FIG. 5 is a schematic view of another embodiment of heat exchange system employing a condensing coil.

DETAILED DESCRIPTION

Figure 1:
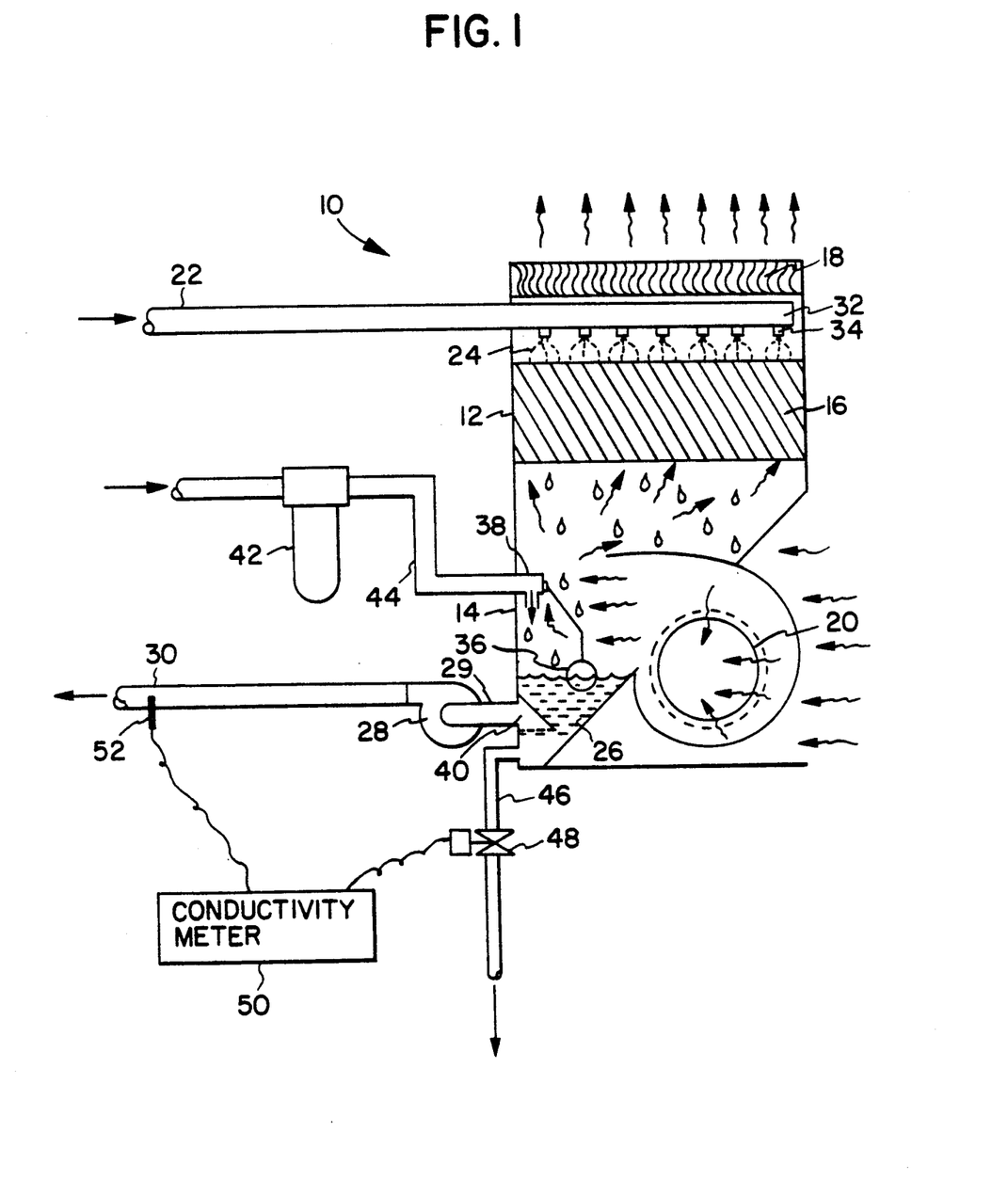
FIG. 1 is an elevational, cross-sectional view of a cooling tower utilizing the improved biocide chemical method and apparatus in accordance with the present invention.

Referring now to FIG. 1, a cooling tower 10 is shown generally in an elevation, cross-sectional view with the water treatment system in accordance with application of U.S. Ser. No. 07/900244. Although a cooling tower 10 is shown in FIG. 1, the present invention could be utilized with any type of evaporative cooling equipment such as evaporative condensers, closed-circuit fluid coolers, direct evaporative coolers, as well as others. Also, cooling tower 10 is shown as a forced draft counterflow cooling tower, though the present invention could be utilized with other types of cooling towers such as induced draft counterflow, cross-flow, natural draft hyperbolic, among other types.

In FIG. 1, Cooling tower 10 comprises outside casing 12 and collection basin 14. Attached to casing 12 is fan 20, which could be a centrifugal or squirrel cage fan, as shown, or an axial fan. Cooling tower 10 also comprises drift particle eliminators 18, which typically consist of a plurality of thin plastic or metal sheets arranged to prevent entrained moisture particles from passing through eliminators 18 and outside of cooling tower 10.

Recirculated water spray header 32 passes through casing 12 into cooling tower 10. Spray header 32 typically is constructed of galvanized or polyvinyl chloride (PVC) piping. Orifice nozzles 34 are attached to spray header 32 and are typically manufactured of a plastic material such as polypropylene, though other similar plastic materials are often utilized.

Positioned below spray header 32 is heat transfer media 16. Heat transfer media 16 generally comprises a plurality of thin plastic sheets over which the recirculated water passes. Heat transfer media 16 is generally designed to maximize the heat transfer surface area between the air and recirculated water while minimizing the pressure drop of the air flow through cooling tower 10. Suction screen 40 is located in basin 14. Suction screen 40 is connected to circulating pump 28 via line 29. Suction screen 40 typically comprises a metallic screen, such as galvanized or stainless steel, and is intended to prevent debris from leaving basin 14. Circulating pump 28 is connected to line 30 which transports the recirculating water back to the process requiring cooling.

Blow down line 46 extends from basin 14 of cooling tower 10 to a drain not shown in the figure. The purpose of blow down line 46 is to provide a means for removing a portion of the recirculated water to control the level of dissolved solids within the system. Valve 48 is positioned in blow down line 46 to control the amount of recirculated water that is bled from basin 14. Typically valve 48 is connected to conductivity meter 50 which measures the conductivity of the recirculated water via conductivity probe 52 which usually is located within line 30. When the dissolved solids in the recirculated water increase, the electrical conductivity of the water also increases. When the conductivity of the recirculated water reaches a pre-set level, conductivity meter 50 typically transmits a signal to valve 48 to open and allow a portion of the recirculated water to escape from basin 14. Although it is preferred that an automatic blow-down system is utilized, such as that described above, manual blowdown methods may also be utilized to control the dissolved solids level in the recirculated water.

As a result of the need to add additional water to the evaporative cooling system to replace the water lost from the system due to evaporation and blow down, a make-up water control apparatus is typically utilized. The make-up water control system in FIG. 1 is shown as float ball 36 and mechanical valve 38, although alternative make-up control devices, such as electronic level controllers and valves, could be utilized.

Float ball 36 is connected to mechanical valve 38 which, in turn, is connected to make-up water supply line 44. Located within the make-up supply line is canister 42, in accordance with the present invention, which is filled with solid biocide chemicals.

Figure 2:
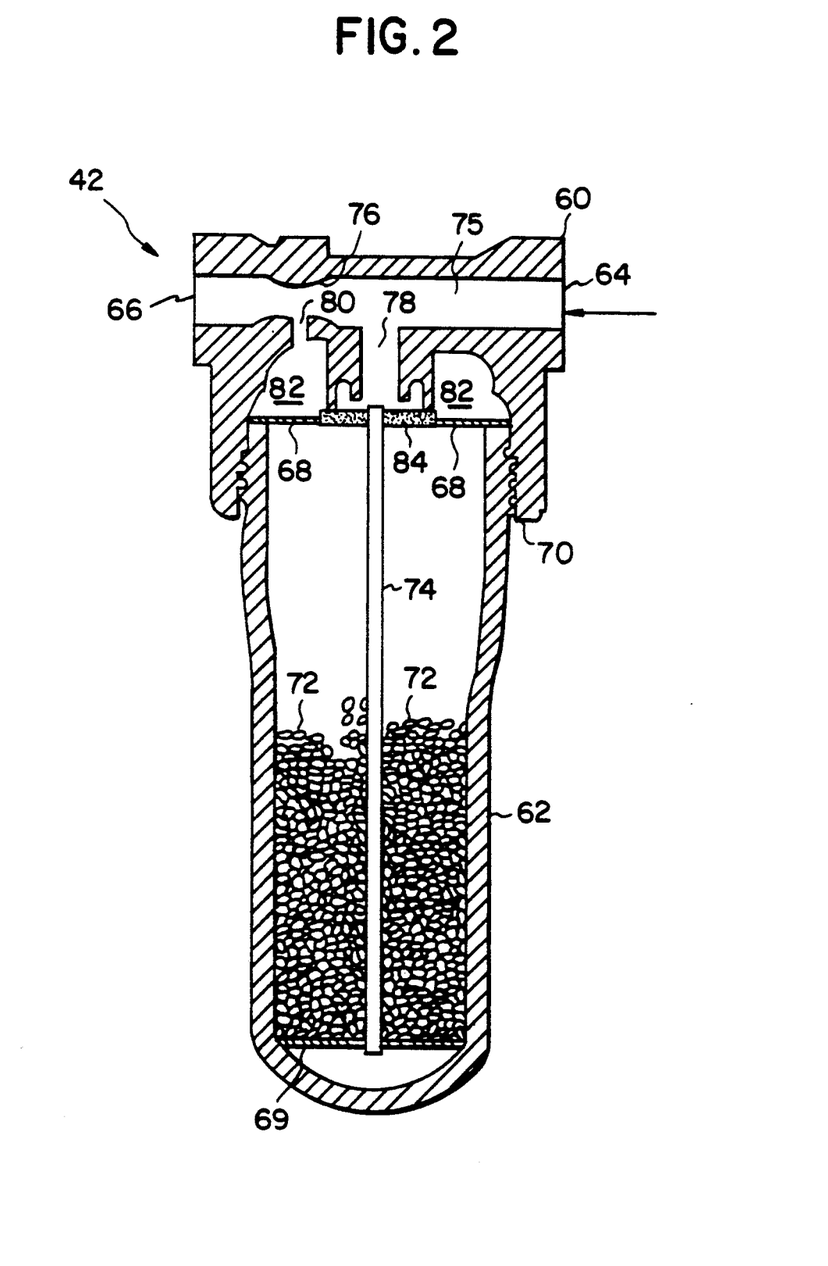
FIG. 2 is a cross-sectional view of a biocide chemical canister device in accordance with the present invention.

A close-up view of canister 42 is shown in FIG. 2. Typically, canister 42 comprises a top housing 60 and a bottom container 62. Bottom container 62 and top housing 60 are usually connectable via screw type threads 70, though other types of connection methods could be utilized. Canister 42 is typically molded of polypropylene, though other similar plastic materials could be utilized.

Figure 3:
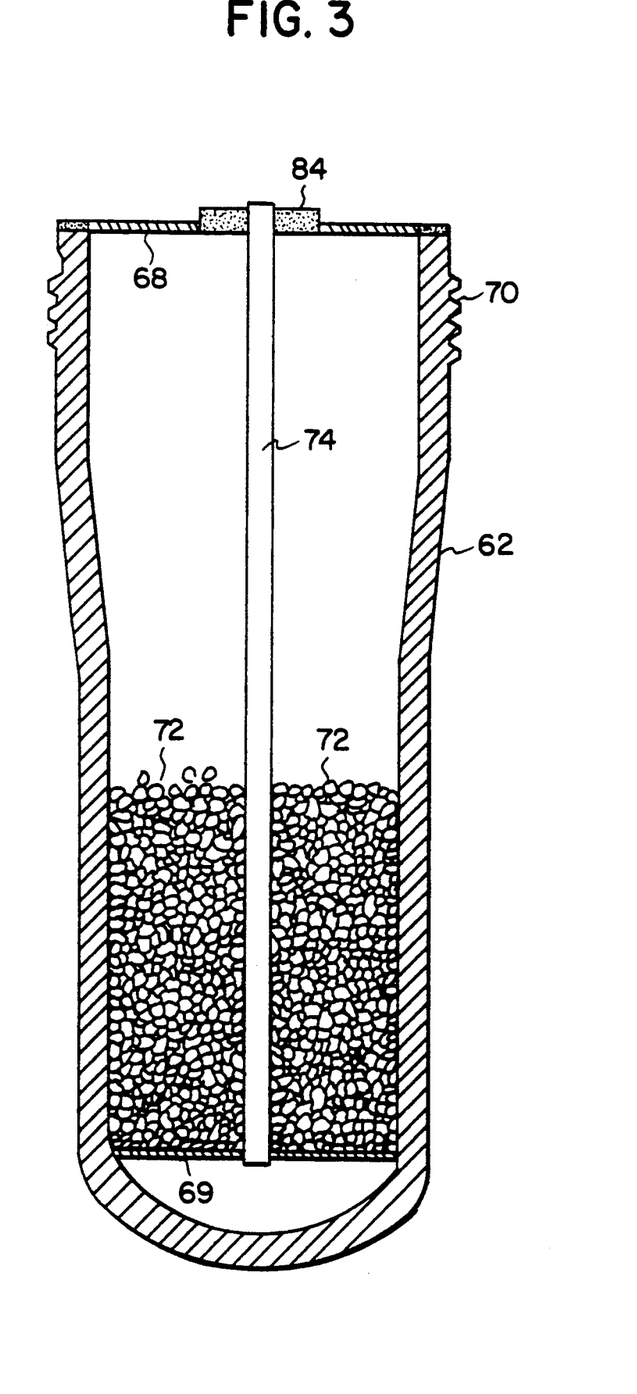
FIG. 3 is a cross-sectional view of the bottom section of the biocide chemical canister in accordance with the present invention.

Referring now to FIG. 3, bottom container 62 is typically provided with top restraining screen 68 and bottom restraining screen 69 which are used to contain a solid form biocide chemical, shown generally as 72. Top restraining screen 68 and bottom restraining screen 69 are typically thin, perforated plastic or metallic sheets which are designed to allow water to flow through the screen while restraining biocide 72 within the confines of container 62.

Initially, bottom container 62 is completely filled with biocide chemical 72. As water flows through bottom container 62, biocide chemical 72 is depleted and the level of biocide chemical will be reduced, as shown in the figure. In the preferred embodiment, biocide chemical 72 is in the form of round spheres, or particles, although other solid form shapes could also be utilized.

In the preferred embodiment of the present invention, biocide or treatment chemical 72 has a density significantly greater than that of water. Accordingly, as the water flows up through biocide chemical 72 bed, the majority of biocide chemical 72 remains in the bottom of the container 62. However, as biocide chemical 72 dissolves, the chemical beads become smaller in size until a point is reached where the drag on some of the biocide chemical particles created by flow of water through the bed is greater than the gravitational force on the particle. When this point is reached, the biocide chemical particle will become fluidized and will be carried to the top of container 72. The mesh of top restraining screen 68 is preferably large enough to pass such particles through top restraining screen 68 and into the main stream of make-up water. In its preferred embodiment top restraining screen 68 will have a mesh with openings of about 0.020 inches.

Tube 74 is also included in bottom container 62. Tube 74 extends from a top side of bottom container 62 down through the center of bottom container 62 and through bottom restraining screen 69. The purpose of tube 74 is to transport a flow of fluid from top housing 60 down to the bottom of bottom container 62.

When bottom container 62 and top housing 60 are connected, gasket 84 engages top housing 60 to provide a water tight seal. Gasket 84 is preferably made of ethylene propylene dimonomer rubber or silicone rubber, though other similar rubber materials could be utilized. In FIG. 2, it can be seen that the purpose of gasket 84 is to prevent the make-up water from bypassing the chemical bed and leaking from opening 78 directly into chamber 82.

Figure 4:
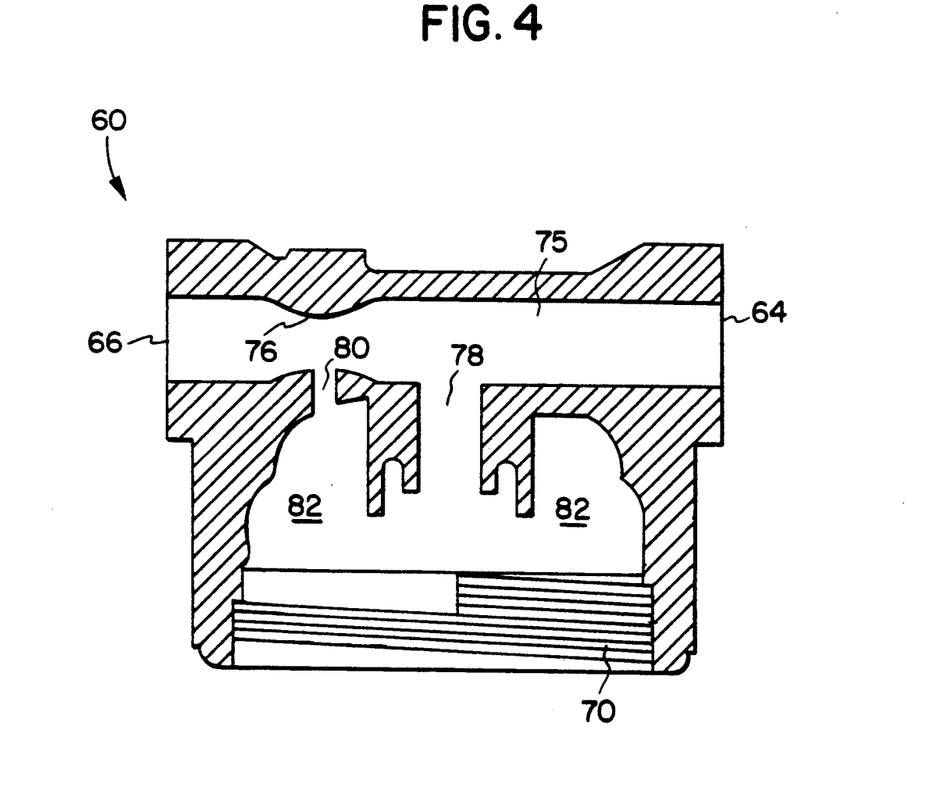
FIG. 4 is a cross-sectional view of the top section of the biocide chemical canister in accordance with the present invention.

Referring now to FIG. 4, top housing 60 is provided with inlet 64 for receiving incoming make up water flow and with outlet 66 for passing the make-up flow out of top housing 60 and back into the make-up supply line. Venturi 76 is positioned in the water flow path in top housing 60 between inlet 64 and outlet 66. The purpose of venturi 76 is to accelerate the water flow through the top housing in order to create a side stream flow of make up which will be brought in contact with biocide chemical 72 contained within bottom container 62.

Typically, venturi 76 will have a smooth, generally circular entrance and exit as is shown on the figure. This arrangement is preferred in order to minimize the turbulence of the flow through venturi 76. However, a similar effect could be obtained if, instead of using smooth venturi 76, an orifice plate or some other restriction to flow was utilized.

Referring back to FIG. 2, the creation of the side stream flow of make-up water will be explained. The side-stream flow of water is created by positioning side stream inlet 78 in top housing 60 just prior to venturi 76. In addition, side stream outlet 80 is positioned within venturi 76. As the make-up water flows through top housing 60, the majority of the flow passes through venturi 76 and outlet 66. However, as the make-up water flows through top housing 60, an area of low static pressure is created within and downstream of venturi 76. Accordingly, the static pressure of the water at side stream outlet 80 is less than the static pressure of the water at side stream inlet 78.

As a result of this difference in static pressures, a small portion of the make-up flow is split apart from the major flow stream and is forced through side stream inlet 78. Once the side stream has passed through side stream inlet 78, the side stream is forced down through tube 74, back up through biocide chemical 72, through chamber 82 and side stream outlet 80. As the side stream flows through side stream outlet 80, it rejoins, and is mixed back into, the main make-up flow.

In the illustrated embodiment of FIGS. 1-4, the biocide chemical used in bottom container 62 is prilled elemental iodine. Prilled elemental iodine is preferred for several reasons. First, elemental iodine has a relatively low solubility in cool water of approximately 300 mg/l. This low solubility coupled with the relatively long contact time of the side stream flow with biocide 72 allows the side stream flow to reach a constant, elemental iodine saturation concentration.

Preferably, the iodine concentration within the recirculating water should be held between 0.1 ppm and 0.5 ppm. It has been found that if the make-up water added to the recirculating water has an iodine concentration of about 3.0 ppm iodine, the level of iodine within the recirculating water will be within the 0.1 to 0.5 ppm range. Accordingly, in order to achieve a 3.0 ppm iodine concentration in the make-up water stream, it is necessary that the side stream flow constitute about 1% of the total make-up water flow through device 42. When this side stream, having a constant 300 ppm iodine concentration, is re-mixed into the main make-up water flow stream, the resulting mixture will have a constant iodine concentration of about 3 mg/l. It is recognized, however, that differing iodine concentrations could be obtained, and may be preferred in certain instances, by varying the volume of the side stream flow.

The low solubility of iodine also prevents excessive iodine from being dissolved and wasted during times when the addition of make-up water is not required. During such periods, the side stream will remain in contact with biocide chemical 72 within bottom container 62. However, due to the low solubility of elemental iodine, the only iodine that will dissolve into the side stream is the amount which is necessary to saturate the side stream. Once this saturation level is reached, no additional iodine will dissolve. This feature allows the supply of iodine in bottom container 62 to last for extended periods of time. In fact, it is possible to calculate an amount of iodine which, if placed within bottom container 62, will last for an entire operating season.

Although prilled elemental iodine is preferred, the present invention could also be utilized with other oxidizing biocides such as chlorine or bromine compounds and other organic or inorganic biocides which are slightly soluble in water. However, the degree of solubility of alternative biocides will have to be considered if all the anticipated features of the present invention are to be realized.

It is anticipated that the present invention will find most use in systems utilizing evaporative cooling equipment in the small to mid-size range, that is with cooling equipment with a cooling ratio of up to about 350 to 400 tons. When used with equipment of this size, it is possible to provide sufficient iodine to last for an entire operating season within a canister of a reasonable size. In addition, systems in the small to mid-size range often are left untreated, or are treated using the slug-feed method, due to the high cost of installing automatic chemical feed equipment. As a result, the present invention will provide a much improved means for cost-effectively treating such systems.

In typical applications, it is estimated that approximately 0.1 pound of iodine per ton of cooling will be required to supply iodine to an evaporative cooling system for an entire season. This amount of iodine is based upon the assumption that the evaporative cooling equipment will operate at about five cycles of concentration. Of course, if the evaporative cooling equipment is operated at other than 5 cycles of concentrations, or if the operating season is longer or shorter than that assumed in this estimate, the amount of iodine that will be required to last an entire season may change.

Usually, the canisters used in accordance with the present invention will be approximately 3 to 8 inches in diameter and about 6 to 36 inches in length. With canisters of this size, passageway 75 will usually be about 0.63 to 1.0 inches in diameter.

In order to create a side stream flow equal to about 1% of the total flow in the preferred embodiment of the present invention, the cross-sectional flow area of venturi 76 will generally need to be equal to about 50% of the cross-sectional flow area of passageway 75. Generally, side stream inlet 78 is oversized and provides minimal restriction to the side stream flow. However, the size of side stream outlet 80 must be controlled and matched with the size of venturi 76 so that a sufficient restriction to flow will be provided in order to prevent excessive side stream flow. For example, if a venturi having a diameter of 0.59 inches is utilized, side stream outlet 80 will need to be about 0.09 inches in diameter. However, other combinations of venturi size and side stream outlet sizes could also be used.

An important feature of the present invention is that the biocide chemical is added to the evaporative cooling equipment in proportion to the need for biological control within the system. As shown by FIG. 1, this is accomplished by adding the biocide chemical contained in canister 42 via the make-up water supply 44.

It is known in the art that the growth rate of microbiological organisms in evaporative cooling equipment typically increases as the recirculating water temperature increases. In most evaporative cooling systems, the recirculating water temperature increases as the load on the equipment, or the amount of heat that must be rejected from the equipment, increases.

It is also known in the art that as the load on evaporative cooling equipment increases, the amount of water that is evaporated from the equipment must necessarily increase to provide the required cooling. In addition, it is also necessary to increase the blow down rate from the tower as the evaporation rate increases in order to maintain the level of dissolved solids at a relatively constant level. Due to the increase in the loss of water from the system from increased evaporation and increased blow down rate at high loads, it is necessary to correspondingly increase the amount of make-up water flow to the equipment in order to maintain sufficient water within the system.

Since the amount of make-up water added to the system is approximately proportional to the load on the evaporative cooling equipment, and since the load on the system is approximately proportional to the rate of microbiological growth within the evaporative cooling equipment, it logically follows that the rate of make-up water added to an evaporative cooling system is approximately proportional to the rate of microbiological growth within the system.

The invention of the application utilizes this relationship to provide a method of biocidal water treatment that automatically, without expensive automatic chemical feed equipment and daily operator attention, adds biocide chemical in proportion to the need for microbial control within evaporative cooling systems. This minimizes the chemical waste which is present with most systems and is a significant advantage over prior art systems which typically add biocide chemical on a timed basis.

For example, typical evaporative cooling equipment used on comfort cooling, or air conditioning, systems operate at their maximum capacity for less than 10% of the time the equipment is in operation. Accordingly, if, in a prior art time based, automatic biocide feed system, the rate of biocide addition is set based upon the maximum biological growth rate, the prior art system would overfeed biocide chemical approximately 90% of the time.

On the other hand, if the timed rate of biocide addition in such a prior art system were based on the average biological growth rate, the prior art system would overfeed and waste biocide chemical at times when the load on the equipment was small and the recirculating water temperature was low. Similarly, such prior art system would underfeed biocide chemical at times of high load when the recirculated water temperature was high. If harmful pathogens are present within the system, this underfeed situation could allow the concentration of harmful pathogens in the system to increase to potentially dangerous levels.

Figure 5:
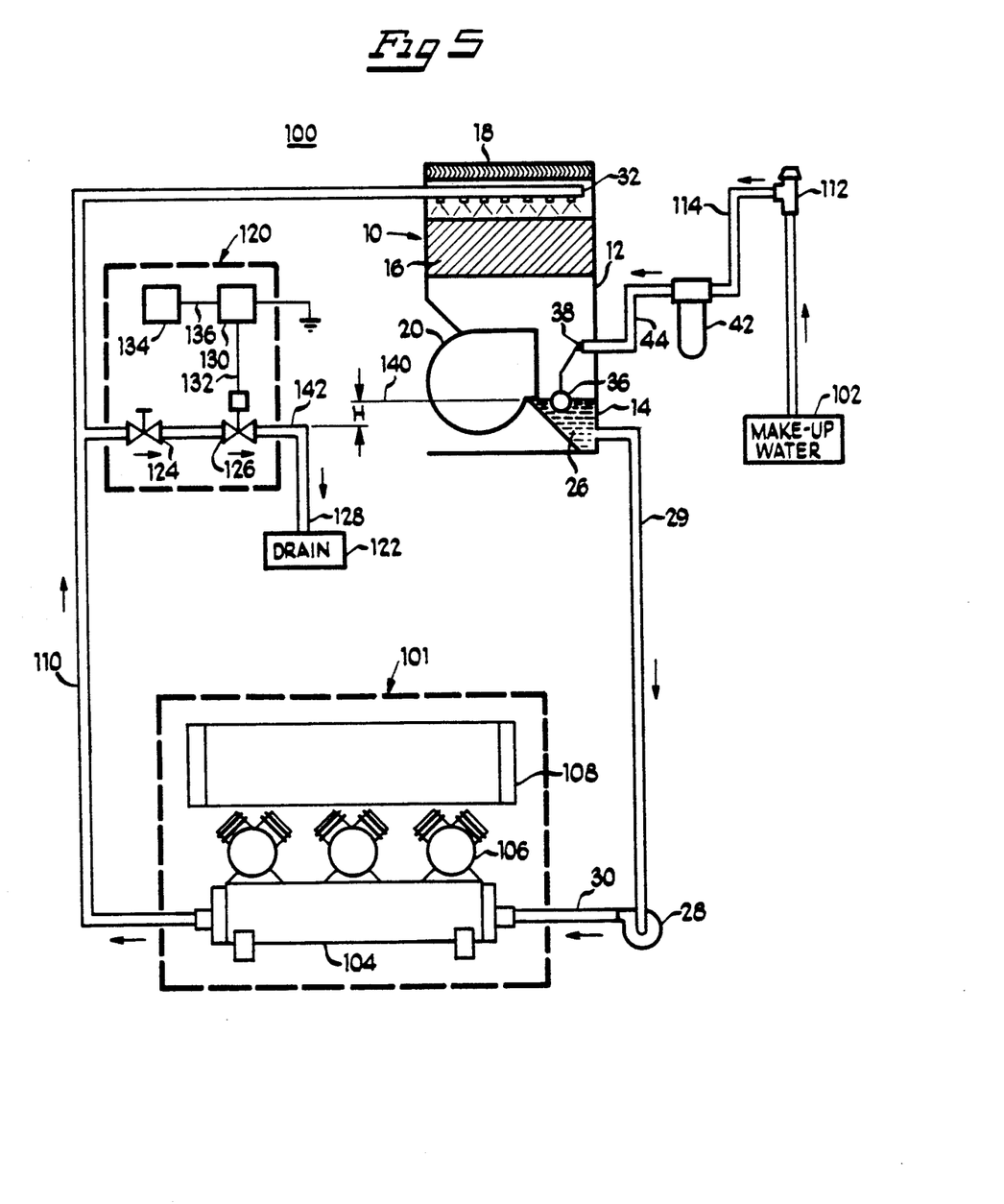
FIG. 5 is a schematic view of an exemplary heat exchange system with a cooling tower, which system is coupled to the present invention.

The present invention particularly teaches a control system and method for providing continuing communication of fluid through an idled recirculating water system. More particularly, the present invention in its preferred embodiment cooperates with the above-taught biocide feeding apparatus to provide continuous biocidal feeding through the recirculating system and its associated components during inoperative modes. In FIG. 5, an exemplary heat exchange system 100 is illustrated as coupled to a source of make-up water 102, such as city water or other source. In this illustration, recirculating pump 28 is coupled by line 29 to sump 26 of cooling tower basin 14. Pump 28 is operable to communicate fluid at a pressure through the illustrated components of the heat exchange system. In FIG. 5, heat exchange system 100 has chiller 101 with components which include condenser 104, a plurality of compressors 106 and, evaporator or receiver 108. The arrangement and illustration of the chiller components is utilized for illustrative purposes only and is not a limitation to the present invention.

Water flow from the components of chiller 101 is communicated through cooling line 110 to spray header 32 in cooling tower 10 during normal recirculation and operation of the heat exchange system 100. The biocidal feeder arrangement of the present application is illustrated in a similar arrangement to the previously disclosed structure of the above-cited patent application. However, it is noted that make-up water supply line 44 extends between canister 42 and mechanical valve 38 in or at cooling tower casing 12. Up stream of the canister, optional anti-siphon valve 112 is serially arranged in or between make-up water supply 102 and the entry port of canister 42, which valve 112 is a safety measure for purposes of preventing backflow of biocide into a potable water system during periods of maintenance or other inoperative periods.

In FIG. 5, cooling tower 10 is elevated above condenser 104, compressors 106 and the evaporator 108. Feed line or conduit 29 connects pump 28 to sump 26 for gravity feed of fluid to pump 28 and downstream communication to the components of chiller 101, for example. During normal operation of system 100, water from sump 26 is circulated through conduit 29 to pump 28 for downstream communication through line 30 to the condenser component 104 of chiller 101 and thereafter through conduit 110 to water spray header 32 for communication to heat transfer media 16 and return to sump 26 for recirculation. Make-up water from supply source 102 is connected to sump 26 of basin 14 through valve 112, intermediate conduit 114 and canister 42, which canister 42 concentrates a biocide in the water as well as transfers the primary water stream to mechanical valve 38. A float ball 36 in sump 26 is operable to open and close mechanical valve 38 in response to changes in the water level in sump 26, which change in water level is reflective of the water loss of the recirculating system during normal operations. Although valve 38 is illustrated as a float control valve the relationship of water losses and make-up water requirements being generally proportional to the requirements for a biocide in the fluid operating system were discussed and taught in the above-cited application. The fluid flow in system 100 of the preferred embodiment is similarly operable.

At shutdown of heat exchange system 100, such as for maintenance or during long periods of inactivity in the environment associated with such cooling system or chiller 101, system pump 28 is inoperable. Dynamic water flow to and through system 101 by recirculating pump 28 ceases. At this period of inactivity, sump 26 collects or accumulates water which is entrained or trapped in media 16, as well as the drift eliminators and throughout the tower arrangement during normal operation. Water levels in sump 26 will rise and elevate float ball 36, which may close or almost close mechanical valve 38, thus limiting fluid flow through biocide canister 42 from make-up water supply source 102. During these periods of downtime bacteria, algae and other contaminants may start to communicate or grow in the several operating components and conduits of system 100. Thus, it is desirable to continue a nominal flow of biocide from canister 42 through the components of system 100 to maintain a small biocide concentration and fluid movement to minimize microbial growth during these idle periods. In the present invention, idle system flow control arrangement 120 provides nominal or minimal waterflow from sump 26 past inoperable pump 28 and through the components of chiller 101, such as condenser 104, and communicates fluid through conduit 110 for discharge to an external discharge device, such as a drain or holding tank 122. The exact source of discharge from conduit lines and sump 26 is not a limitation to the control apparatus and the method of the present invention.

Apparatus 120 is shown with a first valve 124, which is illustrated as a manually operable valve that may be preset at a fixed flow rate, and a solenoid operable valve 126 downstream but serially arranged with first valve 124 for its connection to drain 122 by conduit 128. In this illustrated embodiment, solenoid operator 126 is coupled to control apparatus 130 by line 132 for energization in response to a sensed signal from sensor 134 coupled to control apparatus 130 by line 136. Sensor 134 may be any of a plurality of sensing means operable to sense an external parameter or electrical signal, such as a coupling to the power source for operation of centrifugal fan 20 or pump 28, a pressure sensed signal in conduit 30 or another signal indicative of discontinued operations of the recirculating system of heat exchange system 100. The precise signal or sensing means is not a limitation to the present invention. Further, control apparatus 130 may be any of a plurality of controlling means operable to receive sensed signals and to thereafter communicate such signal through lines to an external operator such as solenoid valve 126. These control apparatus include micro-chip devices as utilized in automotive vehicles, control thermostats or other sensing and control means and the type of control apparatus 130 is not a limitation to this invention nor intended to be a prohibition against alternative apparatus.

In operation, or more specifically at discontinued operations of chiller 101 and recirculating pump 28, fluid is collected in sump 26 and it is expected that float ball 36 would thereafter rise to seal mechanical valve 38. In the event that sufficient water was not collected from cooling tower 10, valve 38 would remain open and make-up water would communicate through canister 42, line 44, and valve 38 to sump 26, until the water level of sump 26 rose to first or reference level 140 to seal mechanical valve 38. As noted above cooling tower 10 is at an elevated height from the system components 104, 106, and 108 as well as pump 28 and thus fluid flow or rather static pressure head is provided from sump 26 through conduit 29 to inactive pump 28. In a normal fluid system, the fluid in such U-shaped circuit would reach an equilibrium elevation of approximately the height of reference line 140 which is the reference level of sump 26 at the seal condition of valve 38. Apparatus 120 has valves 124 or 126 positioned to be connected to conduit 110 at a height "H" below the reference level 140 of sump 26.

In response to a sensed condition sensing means 134 can provide a signal to control apparatus 130 to actuate solenoid valve 126 to the open position and the static pressure provided by the differential in height "H", between conduit coupled valve 124 and the elevated sump level in sump 26 provides a nominal flow through conduit 29, pump 28, lines 30 and 110 and valves 124, 126 for communication to discharge means 122 through conduit 128. It should be noted that the flow rate through valve 124 is very small and is only to provide adequate flow to introduce enough biocide from canister 42 to maintain the concentration in the line correlative to the expected growth of microbial materials in the conduits and apparatus of chiller 101 during any period of downtime. Valve 124 is shown as an adjustable valve, which may be manually set to an empirical fluid flow rate to accommodate biocide requirements for such anticipated growth. Solenoid operated valve 126 is illustrated as a normally closed solenoid operator, which may be opened by energization of its electromagnet through from control apparatus 130. Alternatively, valves 124 may be a fixed orifice in a conduit, such as the illustrated short conduit connection 142, for communication of fluid at a fixed rate to drain 122. Similarly apparatus 120 may be a variable rate slide valve, a FEMA valve or a proportional solenoid valve operable to control the fluid flow at varying rates from conduit 110 through conduit 142 to drain 122. The specific valve and valving arrangement is not a limitation to this invention and in fact apparatus 120 may include a metering pump, which is known in the art and may be ready purchased at a supply house, for connection to apparatus and energization from control apparatus 130 to provide a controlled rate of fluid flow from conduit 110 to drain 122.

Thus, it can be seen that the fluid flow from apparatus 120, or more specifically fluid flow from conduit 110 through apparatus 120 to drain 122, will operate to slightly reduce the water level in sump 26 from reference level 140 to some lower level down to a line co-linear with line 142 which causes float valve 38 to open and introduce biocide-containing water to flow into sump 26, down conduit 29, through pump 28 and chiller 101, and up conduit 110.

Figure 6:
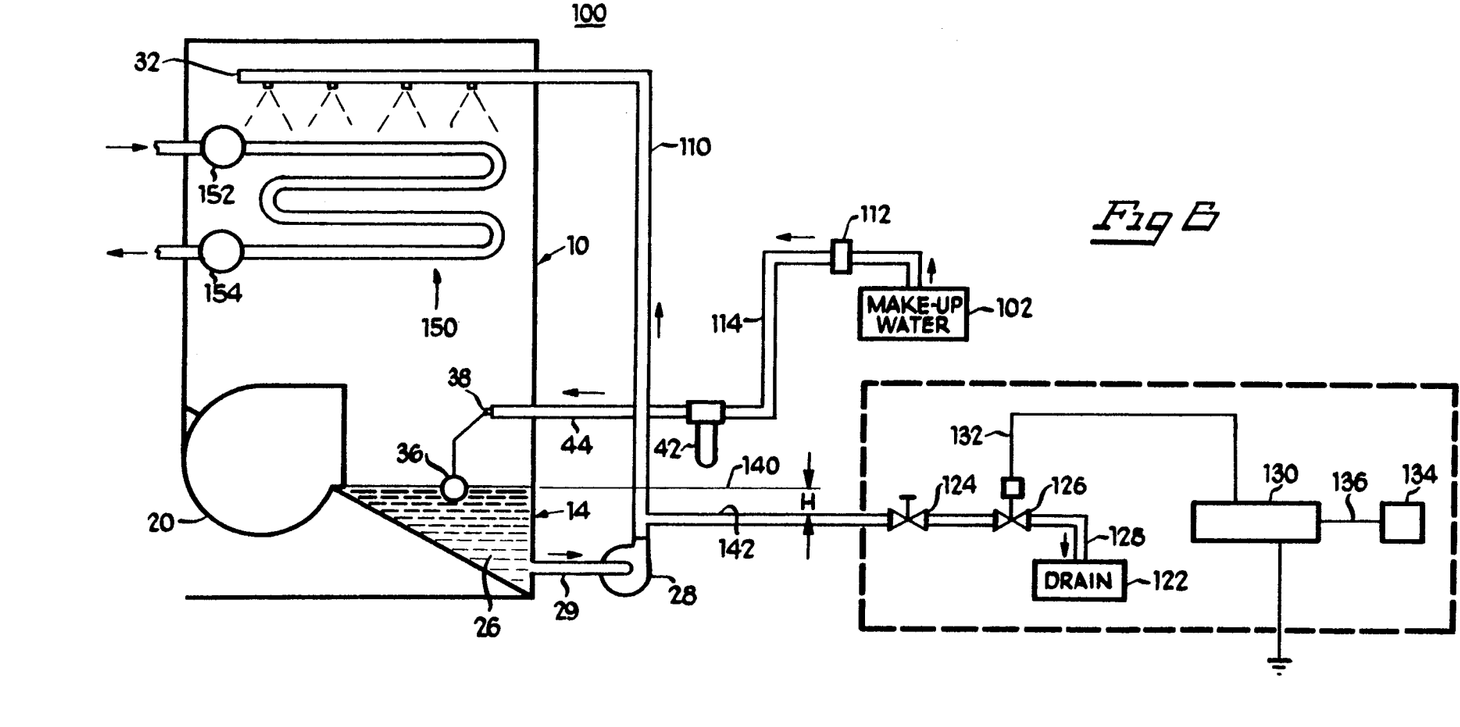

In an alternative embodiment, heat exchange system 100 is schematically illustrated in FIG. 6, as an evaporative condenser arrangement with a condensing coil 150 positioned in tower 10 below spray header 32. In this arrangement, a refrigerant vapor is introduced to coil 150 at entry port 152 with a cooling fluid, such as water, from spray header 32 sprayed on coil 150 to cool and condense the vapor to a liquid for discharge from coil 150 at discharge port 154.

In this figure, pump 28 withdraws cooling fluid (water) from sump 26 and recirculates the water to spray header 32 through conduit 110 during the heat exchange system operating mode. In this operating mode refrigerant vapor is provided to condensing coil 150 through port 152 for condensing to a liquid and discharge from coil 150 at discharge port 154. Cooling fluid from spray header 32 and pump 28 is sprayed over cooling coil 150 to condense the vapor in coil 150.

At shutdown or inoperation of heat exchange coil 150 and pump 28, sump 26 accumulates the fluid from the system. Liquid level sensing and control valve 38, which is again shown as a float-control valve, is operable to open and elevate the sump water level to reference level on line 140. In a preferred embodiment, water level 140 is adequate to induce valve 38 to seal water flow from conduit 44 to sump 26. At shutdown of system 100 and more particularly pump 28 and coil 150, water level 140 is noted above line on conduit 142, which is connected to conduit 110. In FIG. 6, conduit 142 is a distance "H" below reference water level 142 which establishes a hydraulic head of pressure. Sensor 134 is again operable to sense a parameter, such as operation of pump 28, fluid flow in conduit 110 or a water level height in sump 26 to provide a signal to control apparatus 130 of the shutdown or idle operation of system 100. In this mode, flow control valve 124 is again operable to control the flow rate to drain 122 at the opening of solenoid operated valve 124 in response to a signal from apparatus 130. It is apparent that valve 124 may be any of known pneumatically or electromechanically operable valves.

As coolant fluid or water from sump 26 is discharged to drain 122 through conduits 29, 142 and 128, as well as pump 28 and valves 124 and 126, the water level in sump 26 will be lowered. The water drains in response to the static pressure head from the height differential H between conduit 142 and water level 140. As the sump water level decreases, valve 38 will open to permit make-up water from biocide canister and conduit 44 to enter sump 26. The rate of discharge from sump 26 is contemplated as being very small, as the present invention provides means for introducing biocide into the water in sump 26 at a rate adequate to maintain biocide concentration at a level adequate to inhibit microbial growth, and not at a fluid flow rate similar to the flow rate at the operating mode. Valve 124, is again shown as an adjustable valve, which may be adjusted to control the flow rate to drain 122 at an empirically determined rate. Other apparatus may also be used to control the flow through conduit 142 such as a proportional solenoid, a metering pump or other pneumatic or electromechanical operator.

Although FIG. 6, and more particularly coil arrangement 150 was noted as an evaporative condenser arrangement, it is contemplated that a similar configuration could be utilized for a closed circuit fluid cooler. A hot process fluid would be introduced at entry port 152 for cooling in coil 150 to a cooled process fluid for discharge at discharge port 154. However, the operation of idle system flow control arrangement 120 is similar to the operations described above.

While this invention has been described in connection with a specific embodiment thereof, it is to be understood that this is by way of illustration and not by way of limitation; and the scope of the appended claims should be construed as broadly as the prior art will permit.

I claim:

1. In an evaporative heat exchange system with means for fluid conducting, means for retaining water coupled between a source of water make-up and means for recirculating water through said system, means for introducing a water treating substance into said heat exchange system, said heat exchange system having an operative mode with water flowing through said system at a first flow rate and an inoperative mode with said recirculating means inactive, and means for flowing water through at least part of said conducting means and said recirculating means, said water flowing means comprising;

means for receiving water; and, means for automatically opening water flow to said receiving means at said heat exchange system inoperative made at a flow rate less than said first fluid flow rate.

2. In an evaporative heat exchange system as claimed in claim 1, wherein said means for retaining water has a first retained water surface level at said system inoperative mode;

said means for opening water flow is below said first water level.

3. In an evaporative heat exchange system as claimed in claim 2, said system further comprising a liquid level sensing and controlling valve coupled to said make-up water supply to control water flow to said means for retaining water.

4. In an evaporative heat exchange system as claimed in claim 3 wherein said valve is operable to control flow to said water retaining means as a function of said retained water surface level.

5. In an evaporative heat exchange system as claimed in claim 4 wherein said valve is operable to seal flow from said water makeup supply.

6. In an evaporative heat exchange system as claimed in claim 2, wherein said means for opening water flow has at least a second valve operable to control flow to said receiving means and to lower said first retained water surface level.

7. In an evaporative heat exchange system as claimed in claim 6 wherein said means for opening water flow further comprises a third valve in series with said second valve and operable to open flow between said means for fluid conducting and said receiving means.

8. In an evaporative heat exchange system as claimed in claim 1 wherein said receiving means is a drain.

9. In an evaporative heat exchange system as claimed in claim 1 wherein said receiving means is a holding tank.

10. In an evaporative heat exchange system as claimed in claim 1 said system further comprising a cooling tower and said means for retaining water is a sump in said tower.

11. In an evaporative heat exchange system as claimed in claim 7, wherein said third valve is one of a pneumatically operable valve and an electromechanically operable valve.

12. In an evaporative heat exchange system as claimed in claim 7 wherein said third valve is a solenoid operable valve.

13. In an evaporative heat exchange system as claimed in claim 6 wherein said second valve is an electromechanical valve.

14. In an evaporative heat exchange system as claimed in claim 7, wherein said second valve is an electromechanical valve said system further comprising means for controlling;

means for sensing, which is operable to provide a sensed signal, a first line coupling said sensing means and said controlling means to communicate said sensed signal to said controlling means;

a second line coupled between said electromechanical valve and said controlling means to communicate a signal to actuate said electromechanical valve in response to said sensed signal to open fluid flow to said receiving means.

15. In an evaporative heat exchange system as claimed in claim 1 wherein said source of make-up water further comprises means for introducing a biocide coupled between said source of make-up water and said means for retaining, said introducing means operable to provide a biocide to said make-up water communicated to said heat-exchange system means for retaining and means for recirculating through said heat exchange system.

16. In an evaporative heat exchange system as claimed in claim 15 further comprising an anti-siphon valve coupled between said means for introducing said biocide and said source of make-up water to prohibit flow of biocide-containing water from said biocide introducing means and retaining means to said water supply.

17. In an evaporative heat exchange system as claimed in claim 6 wherein said second valve is a manually operable valve.

18. In an evaporative heat exchange system as claimed in claim 17, said means for opening water flow further comprising a third valve serially operable with said manually operable valve, said manual valve providing fluid flow at a fixed rate and said third valve operable to open fluid flow between said means for conducting and said receiving means at inoperation of said heat exchange system.

19. In an evaporative heat exchange system as claimed in claim wherein said fluid conducting means is a plurality of conduits, and said recirculating means is a pump; said system having a cooling tower with said water retaining means, and a condensing means coupled to said pump, said means for opening water flow coupled between said condensing means and said tower.

20. In an evaporative heat exchange system as claimed in claim 1, said system further comprising means for controlling; means for sensing, which is operable to provide a sensed signal; a first line coupling said sensing means and said controlling means to communicate said sensed signal to said controlling means; a second line, said means for opening water flow being a metering pump coupled to said controlling means by said second line and actuable in response to said sensed signal to communicate fluid from said conducting means to said receiving means.

21. In an evaporative heat exchange system as claimed in claim 1, wherein said heat exchange system has a chiller assembly coupled to said means for recirculating and said means for opening water flow.

22. In an evaporative heat exchange system as claimed in claim 1 wherein said heat exchange system has an evaporative condenser arrangement in said system.

23. In an evaporative heat exchange system as claimed in claim 1 wherein said heat exchange system has a fluid cooler in said system.

* * * * *